Sept. 11, 1934.  W. A. APPLETON  1,973,303
OSCILLATION GENERATOR
Filed May 25, 1932

INVENTOR
WILLIAM ARNOLD APPLETON
BY
ATTORNEY

Patented Sept. 11, 1934

1,973,303

UNITED STATES PATENT OFFICE 1,973,303

OSCILLATION GENERATOR

William Arnold Appleton, Wembley, England, assignor to Radio Corporation of America, a corporation of Delaware Application May 25, 1932, Serial No. 613,358
In Great Britain June 12, 1931

8 Claims. (Cl. 250—36)

This invention relates to electrical oscillation generators and more particularly to thermionic valve oscillation generators of the kind in which the anode and grid of the valve are connected directly as regards the working frequency (i. e. either galvanically or through one or more condensers of negligible reactance at the working frequency) to the oscillatory circuit condenser.

Figure 1:
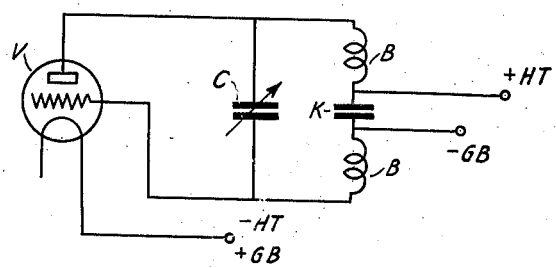

In a well known circuit of the kind in question and illustrated in Figure 1 of the accompanying drawing, the anode of a thermionic valve V is connected to the grid through a tuned circuit consisting of an inductance B and a tuning capacity C in parallel, the inductance being subdivided into two equal halves connected together through a blocking condenser K to one side of which the anode battery is connected and from the other side of which a connection is made through a grid bias battery (if required) to the cathode. It is commonly found that in a circuit such as this, parasitic oscillations (sometimes termed "squiggers") occur, and it has been found that these oscillations are commonly of a frequency corresponding to that of the circuit consisting of the grid anode self-capacity of the valve, the inductance of the leads between the grid and anode and the ends of the parallel tuned circuit, and the capacity in the said parallel tuned circuit, whereas, of course, it is desired that the oscillations obtained should be of a frequency corresponding to that of the parallel tuned circuit. One of the conditions which may cause the generation of these unwanted oscillations obtains when the decrement or damping of the parallel tuned circuit is greater than that of the circuit above defined as determining the frequency of the unwanted oscillations. The wave length of the unwanted or parasitic oscillations is commonly found to be of the order of 1 to 3 metres whereas the wave length required may be of from say 10 to 100 metres. One well known method of attempting to eliminate such parasitic oscillation generation consists in placing small chokes or resistances in series with the leads from the grid and anode of the valve to the parallel or main tuned circuit so as to increase the decrement of this part of the circuit. This method, however, increases the losses in the whole circuit and cannot always be employed.

The present invention has for its object to provide improved means for preventing the generation of parasitic oscillations, and this object is achieved by providing in the condenser branch of the main tuned circuit one or more phasing chokes or inductances so arranged that the capacity of the condenser in the main tuned circuit is in effect brought into phase or step with the self capacity between the anode and grid of the valve.

In carrying out the invention the phasing means should be of such magnitude that their inductive reactance is equal to or slightly higher than the inductive reactance in the oscillatory circuit which would, were the phasing means absent, determine the frequency of undesired parasitic oscillations.

Preferably two phasing chokes are employed, these chokes being included in the condenser branch of the main tuned circuit on either side of the condenser therein. The inductive reactances of the two chokes should be in similar relation to the inductive reactances of the two leads between the main tuned circuit and the anode and grid of the valve.

Although, as above stated, the arrangement in which two phasing chokes are provided is preferred, it will generally be found that one phasing choke is sufficient to prevent the generation of parasitic oscillations.

A better understanding of the present invention may be had by referring to the accompanying drawing wherein Figure 1 illustrates a well known circuit arrangement exemplifying prior art practice, as mentioned above, and Figures 2 to 4 illustrate various embodiments of the invention.

Figure 2:
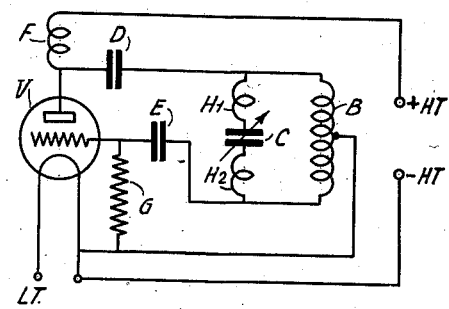

Referring to Figure 2, the plate and grid of the valve V therein shown are connected to an oscillatory circuit through blocking condensers D and E the former being an anode blocking condenser and the latter a grid blocking condenser, both condensers being of such size as to amount practically to short circuits as regards the working frequency. The oscillatory circuit consists of an inductance B and a shunt tuning condenser C and, as will be seen, inductances or chokes $H_1$ $H_2$ are connected in series with the condenser C and on opposite sides thereof in the oscillatory circuit BC. The chokes $H_1$ and $H_2$ are phasing chokes and their inductive reactances should be in similar relation to the inductive reactances of the two leads between the main tuned circuit BC and the anode and grid of the valve V. G is a grid leak resistance and F a high frequency choke. By virtue of the provision of the chokes $H_1$ $H_2$ in the leads to the condenser C the oscillatory potential at the terminals of the said condenser C is caused to be in the same phase at any given instant as the oscillatory potential between the anode and grid of the valve.

Figure 3:
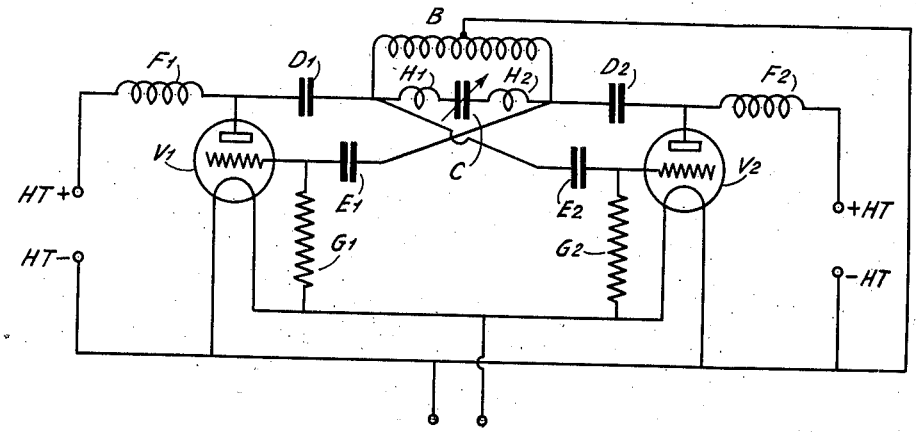

In the modification shown in Figure 3, two valves $V_1$ $V_2$ in pushpull are employed said valves having a common oscillatory circuit BC which is in effect connected between the common anode point and the grids of the valves. Connection between the valves $V_1$ $V_2$ and the oscillatory circuit BC is effected through blocking condensers $D_1$ $D_2$ and $E_1$ $E_2$. $H_1$ $H_2$ are the phasing chokes or inductances and $G_1$ and $G_2$ are grid resistances. $F_1$ $F_2$ are high frequency chokes.

Figure 4:
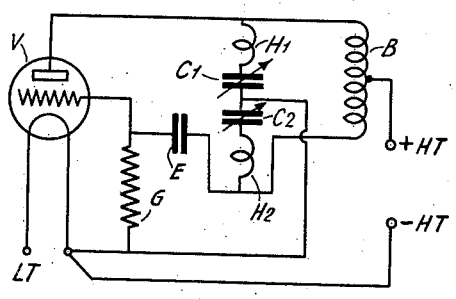

Figure 4 shows a modification of the arrangement shown in Figure 2 the modification consisting in employing in place of a single tuned condenser C two tuned condenser $C_1$ $C_2$ in series, the cathode connection being taken to the midpoint between them.

Having now particularly described and ascertained the nature of my said invention and in what manner the same is to be performed what is claimed is:—

1. A thermionic oscillation generator arrangement of the type employing a valve having an anode and a control electrode and wherein an oscillatory circuit comprising a condenser and inductance in parallel relationship is coupled to said anode and control electrode, characterized in this, that there are a plurality of phasing elements in said oscillatory circuit serially connected to said condenser and said inductance, said elements comprising inductance having such value that the oscillatory potential at the terminals of said condenser is in phase at any instant with the oscillatory potential between the anode and control electrode of the valve.

2. A thermionic valve oscillation generator comprising a valve having an anode and a control electrode, an oscillatory circuit coupled to said anode and control electrode comprising a condenser and an inductance in parallel relationship with respect thereto, and a phasing element on each side of said condenser and effectively connected in series between said condenser and said inductance, said phasing elements having such value that the oscillatory potential at the terminals of said condenser is in phase at any instant with the oscillatory potential between the anode and control electrode of the valve.

3. An arrangement as defined in claim 2 characterized in this, that said phasing elements are inductances.

4. A thermionic oscillation generator comprising a valve having an anode and a control electrode and a tuned oscillatory circuit comprising a variable condenser and an inductance in parallel relationship with respect to said condenser, individual connections from said anode and said control electrode to said oscillatory circuit, and a phasing element on each side of said tuning condenser and effectively connected in series between said condenser and inductance, said phasing elements having such value that the oscillatory potential at the terminals of said condenser is in phase at any instant with the oscillatory potential between the anode and control electrode of the valve.

5. A thermionic valve oscillation generator comprising a valve having an anode, cathode and control electrode, a tuned oscillatory circuit comprising a variable condenser and an inductance in parallel relationship coupled to said anode and control electrode, a phasing element on each side of said tuned condenser and effectively connected in series between said condenser and said inductance, said phasing elements having such value that the oscillatory potential at the terminals of said condenser at any instant is in the same phase as the oscillatory potential between the anode and control electrode of the valve, and a connection from the center of said inductance to said cathode.

6. A thermionic valve oscillation generator comprising a valve having an anode, cathode and control electrode, a tuned oscillatory circuit comprising capacity means and an inductance in parallel relationship with respect to said capacity means coupled to said anode and control electrode, a phasing element on each side of said capacity means and effectively connected in series between said capacity means and said inductance, said phasing elements comprising inductance having such value that the oscillatory potential at the terminals of said condenser at any instant is in the same phase as the oscillatory potential between the anode and control electrode of the valve, and a connection from the electrical center of said capacity means to said cathode.

7. An oscillation generator comprising two thermionic tubes in push-pull relationship, each having an anode and control electrode, an oscillatory circuit comprising an inductance and a tuned capacity in parallel relationship effectively connected between said anodes, individual connections from the grids of said two tubes to opposite sides of said inductance, and a phasing inductance on each side of said capacity and serially connected between said capacity and its parallel connected inductance, said phasing inductances having such value that the oscillatory potential at the terminals of said condenser at any instant is in the same phase as the oscillatory potential between the anode and control electrode of the valve.

8. A thermionic oscillation generator arrangement of the type employing a valve having an anode and a control electrode and wherein an oscillatory circuit comprising a condenser and inductance in parallel relationship is coupled to said anode and control electrode, characterized in this that there is a phasing element in said oscillatory circuit serially connected to said condenser and said inductance, said element comprising an inductance having such value that the oscillatory potential at the terminals of said condenser is in phase at any instant with the oscillatory potential between the anode and control electrode of the valve.

WILLIAM ARNOLD APPLETON.